United States Patent [19]

Swindells et al.

[11] 4,154,809

[45] May 15, 1979

[54] HIGH EFFICIENCY CHLORINE DIOXIDE PRODUCTION USING HCl AS ACID AND METHANOL ADDITION

[75] Inventors: Richard Swindells, Caledon; Maurice C. J. Fredette, Mississauga, both of Canada

[73] Assignee: Erco Industries Limited, Islington, Canada

[21] Appl. No.: 893,463

[22] Filed: Apr. 4, 1978

Related U.S. Application Data

[63] Continuation of Ser. No. 770,358, Feb. 22, 1977, abandoned.

[30] Foreign Application Priority Data

Mar. 19, 1976 [GB] United Kingdom ............... 11123/76

[51] Int. Cl.$^2$ .............................................. C01B 11/02
[52] U.S. Cl. .................................... 423/478; 423/479
[58] Field of Search ........................ 423/478, 479, 500

[56] References Cited

U.S. PATENT DOCUMENTS

| | | | |
|---|---|---|---|
| 2,936,219 | 5/1960 | Rapson | 423/478 |
| 3,563,702 | 2/1971 | Partridge et al. | 423/478 |
| 3,816,077 | 6/1974 | Fuller et al. | 423/478 |
| 3,929,974 | 12/1975 | Winfield | 423/478 |

*Primary Examiner*—Brian Hearn
*Attorney, Agent, or Firm*—Sim & McBurney

[57] ABSTRACT

The efficiency of a low actual hydrogen ion concentration chlorine dioxide producing process in which a chlorate and hydrochloric acid or hydrogen chloride are fed to a reaction medium in a single vessel generator-evaporator crystallizer is increased by the use of small quantities of methanol.

5 Claims, No Drawings

HIGH EFFICIENCY CHLORINE DIOXIDE PRODUCTION USING HCL AS ACID AND METHANOL ADDITION

This is a continuation of application Ser. No. 770,358 filed Feb. 22, 1977 (now abandoned).

FIELD OF INVENTION

The present invention relates to the production of chlorine dioxide.

BACKGROUND TO THE INVENTION

It is known from Canadian Patent No. 913,328 to produce chlorine dioxide and chlorine by reduction of sodium chlorate with chloride ions in an acid aqueous medium in which the chloride ions and the acidity are introduced by hydrochloric acid.

The reactions which are involved in the reduction of chlorate with hydrochloric acid are represented by the equations:

$$NaClO_3 + 2HCl \rightarrow ClO_2 + \tfrac{1}{2}Cl_2 + H_2O + NaCl \quad (1)$$

$$3NaClO_3 + 6HCl \rightarrow 3Cl_2 + 3H_2O + 3NaCl \quad (2)$$

The process of the prior patent is carried out in a single chambered generator-evaporator-crystallizer vessel to form chlorine dioxide in continuous manner from a reaction medium held in the reaction vessel. The reaction medium is maintained at its boiling point at the prevailing absolute pressure in the reaction vessel and at a temperature below which substantial decomposition of chlorine dioxide occurs. The reaction vessel is maintained under a subatmospheric pressure to maintain the reaction medium at the boiling point and the water evaporated from the reaction medium is used as a diluent gas for the chlorine dioxide and chlorine. After start-up, by-product sodium chloride is formed and its concentration builds up until the reaction medium is saturated thereby, and the sodium chloride deposits from the reaction medium in the reaction vessel for removal therefrom after reaching saturation.

The process is generally conducted under steady state conditions in which the quantity of water introduced to the reaction vessel with the reactants is balanced by the quantity of water removed from the reaction vessel, mainly as diluent gas for the chlorine dioxide and chlorine, so that the liquid level in the reaction vessel is maintained substantially constant.

Any chlorate which is reacting by above equation (2) produces only chlorine and hence represents an inefficiency in the process. The "efficiency" of the chlorine-dioxide producing process is considered to be the extent to which sodium chlorate is converted to chlorine dioxide in accordance with the reaction of equation (1).

The efficiency may be expressed as a percentage or as the "Gram Atom Percent Chlorine Dioxide" (or G.A.%ClO$_2$), which is a quantitative expression relating to the efficiency of conversion of sodium chlorate to chlorine dioxide by the reaction of equation (1) and refers to the quantity of chlorine atoms formed as chlorine dioxide as a percentage of the total quantity of chlorine atoms formed in a particular gas mixture. Thus:

$$GA\%ClO_2 = \frac{Cl \text{ in } ClO_2}{Cl \text{ in } ClO_2 + Cl \text{ in } Cl_2} \times 100 \quad (3)$$

It follows from equation (3) that the maximum gram atom percent chlorine dioxide attainable is 50%, which is equivalent to an efficiency of 100%.

The process of Canadian Patent No. 913,328 is less than 100% efficient, even under the preferred conditions outlined in copending U.S. application Ser. No. 770,359 filed Feb. 22, 1977 (now U.S. Pat. No. 4,075,308) in the names of Rapson, Fredette and Meyers and assigned to the assignee of the present application usually having an efficiency equivalent to GA% ClO$_2$ values of about 30 to about 44%.

SUMMARY OF INVENTION

It has now been surprisingly found that the efficiency of the process of Canadian Patent No. 913,,328 carried out at an "actual hydrogen ion concentration", may be increased, preferably to about 100% (equivalent to a GA%ClO$_2$ value of 50%), by the use of small quantities of methanol. The methanol is consumed in the generator and a continuous feed must be maintained in the continuous process.

It is theorized that the increase in efficiency of chlorine dioxide production observed in this invention results from reduction of chlorate by methanol.

GENERAL DESCRIPTION OF INVENTION

In this invention, it has been observed that the efficiency increases rapidly with increasing quantities of methanol until the efficiency is approximately 100%. (Corresponding to 50 Gram Atom Percent ClO$_2$ in the gaseous mixture formed from the reaction medium). The quantity required depends on the operating parameters of the system and, for example, in a reactor operating at about 70° C., the most efficient reaction is that of about 0.1 lb MeOH per lb ClO$_2$.

If the quantity of methanol is increased beyond the level required to provide 100% efficient production of chlorine dioxide from a reaction medium to which a chlorate and hydrochloric acid are fed, then the relative proportion of chlorine dioxide to chlorine continues to increase but the reaction which then is carried out is a highly inefficient form of the Solvay process.

The term "acidity" has a number of possible interpretations but its usual meaning is the total acidity present as determined by titration with a solution of a known concentration of sodium hydroxide to a preselected pH end point. This determination of acidity is expressed in terms of normality, i.e., the equivalent number of gram atoms of hydrogen ion per liter of solution corresponding to the value titrated. Acidity determined in this manner is referred to herein as "total acid normality".

As set forth in detail in copending U.S. application Ser. No. 770,361 filed Feb. 22, 1977 by Richard Swindells (now U.S. Pat. No. 4,086,328) and assigned to the assignee of this application, in aqueous systems in which anions of multibasic acids are present, the total acid normality does not represent the concentration of hydrogen ions available for reaction, due to the formation of anionic species containing "bound hydrogen ions." The bound hydrogen ions, although not present in the solution as dissociated or actual hydrogen ions will be included in the calculated normality derived from the value titrated in the determination of total acidity.

The total acidity, therefore, is not necessarily a true measure of the "actual hydrogen ion concentration," which term is used herein to denote the concentration of hydrogen ion available for reaction. The "actual hydrogen ion concentration," as used herein, is the value determined by a pH meter calibrated on an 0.1 normal solution of hydrochloric acid on the assumption that such a solution is 100% dissociated at this concentration. This value may be expressed as pH or in terms of normality, i.e., the number of gram atoms of actual hydrogen ions per liter of solution corresponding to the determined pH.

It is the actual hydrogen ion concentration which determines the rate of reaction of sodium chlorate according to the above equations (1) and (2) rather than total acid normality. Where the chlorine dioxide system contains only chlorate, chloride and hydrogen ions, then the actual hydrogen ion concentration is substantially the same as the total acid normality of the reaction medium and acid normalities in the range of about 0.05 to about 0.3 normal have been found to be operable to achieve satisfactory chlorine dioxide production rates.

When anions of multibasic acids are present, it is necessary for satisfactory chlorine dioxide production rates that the actual hydrogen ion concentration be in the range of about 0.05 to about 0.3 normal. Hence, irrespective of the presence or absence of anions of multibasic acids, the actual hydrogen ion concentration of the reaction medium in this invention is maintained in the range of about 0.05 to about 0.3 normal.

The sodium chloride deposited in the reaction zone and removed therefrom may be used to form sodium chlorate solution for recycle to the reaction zone by electrolysis of an aqueous solution thereof.

The sodium chloride also may be used to form sodium hydroxide and chlorine for a bleach plant by electrolysis of an aqueous solution thereof. If it is desired to proceed by neither of these electrolysis procedures, the sodium chloride may be discarded.

Certain metal ions, such as silver and manganese ions, catalytically improve chlorine dioxide production efficiency and these ions also may be used to supplement the increase the efficiency of chlorine dioxide production achieved by the use of methanol.

However, the use of such catalytic metal ions may be a drawback where their presence in the precipitated salt would be undesirable, such as, where it is intended to use the sodium chloride in an electrolytic cell to produce sodium chlorate for the generator. In this instance, the whole of the increase in efficiency may be provided by methanol.

EXAMPLES

EXAMPLE 1

A chlorine dioxide generator was run having sodium chlorate solution, hydrochloric acid and methanol as the only feeds with the reaction medium was held at its boiling point under a subatmospheric pressure and with sodium chloride precipitating therefrom. The efficiency of chlorine dioxide production was determined.

The reaction conditions and results are set forth in the following Table I:

TABLE I

| Temperature | 70° C. |
| --- | --- |
| Pressure | 190 mm Hg |
| Liquor feed rate: | |
| MeOH | 50% 0.75 ml/min |
| HCl | 37% 4.1 ml/min |

TABLE I-continued

| NaClO$_3$ | 5.4M 8.7 ml/min |
| --- | --- |
| Generator liquor: | |
| HCl | 0.2N |
| NaClO$_3$ | 4.51M |
| NaCl | 2.14M |
| Crystals | NaCl |
| ClO$_2$ production rate | 0.3 g/l/min |
| Gas analysis | 65.5% ClO$_2$ 34.5% Cl$_2$ |
| Efficiency based on chlorate | 95.2% |
| Feed requirement/lb. ClO$_2$ produced | 0.11 lb CH$_3$OH |

The efficiency of a chlorine dioxide generator operating under substantially the same conditions as Table I but omitting the methanol is about 93.4%.

The results of the above Table I indicate that the efficiency of production of chlorine dioxide from a low total acid normality reaction medium containing sodium chlorate and hydrochloric acid and precipitating sodium chloride may be increased by the use of small quantities of methanol.

EXAMPLE 2

A chlorine dioxide generator of the type described above in connection with Example 1 was run under deliberately adverse conditions of efficiency, i.e. at a high mole ratio of chloride ion to chlorate ion. The results are reproduced in the following Table II:

TABLE II

| Temperature (average) | 70° C. |
| --- | --- |
| Pressure (average) | 176mm Hg |
| Duration of run | 181 mins. |
| Chloride to chlorate ion ratio | 1.19 |
| Acidity (Total Acid Normality) | 0.37N |
| Efficiency in absence of methanol | 87% |
| Efficiency in presence of methanol | 99.5% |
| Total NaClO$_3$ feed (6.27M) (liter) | 2.80 |
| Total HCl (12N) (l) | 2.51 |
| Total MeOH feed (50% v/v) (l) | 1.62 |

The results of the above Table II show that a highly inefficient chlorine dioxide producing process may be made highly efficient by the use of methanol.

SUMMARY

The present invention, therefore, provides considerable improvements over prior art systems of producing chlorine dioxide. Modifications are possible within the scope of the invention.

What we claim is:

1. In a process for the production of chlorine dioxide which comprises continuously reducing chlorate ions with chloride ions in an acid aqueous medium containing hydrochloric acid as the sole source of acid and of said chloride ions and having an actual hydrogen ion concentration in the range of about 0.05 to about 0.3 normal by maintaining a reaction vessel containing said aqueous reaction medium under a subatmospheric pressure, maintaining said reaction medium at its boiling point at a temperature below that above which substantial decomposition of chlorine dioxide occurs to evaporate water from the reaction medium and provide a gaseous mixture containing steam, chlorine dioxide and chlorine, removing said gaseous mixture from said reaction vessel, recovering an aqueous solution of chlorine dioxide from said removed mixture, maintaining substantially steady state conditions in said reaction medium by continuously feeding said chlorate and hydrochloric acid or hydrogen chloride into said reaction medium to make up chemicals consumed in said reducing step and to maintain said actual hydrogen ion concentration in the range of about 0.05 to about 0.3 normal, maintaining the liquid level in said reaction vessel substantially constant by balancing water fed to the reaction vessel with water removed therefrom, continuously depositing a chloride of the cation of the chlorate from said reaction medium after the reaction medium becomes saturated thereby, and removing said chloride from said reaction vessel, the improvement which comprises carrying out said process in the presence of methanol in quantities sufficient to improve the efficiency of conversion of chlorate ions to chlorine dioxide by said process.

2. The process of claim 1 wherein said chlorate is sodium chlorate.

3. The process of claim 1 wherein up to about 0.1 lb of methanol per lb. of $ClO_2$ formed is used.

4. The process of claim 1 wherein said reaction medium also contains ionic species catalytically improving the efficiency of the conversion of chlorate ions to chlorine dioxiode.

5. The process of claim 1 wherein sufficient methanol is used to achieve approximately 100% efficiency of conversion of chlorate ions to chlorine dioxide.

* * * * *